Figure 1:
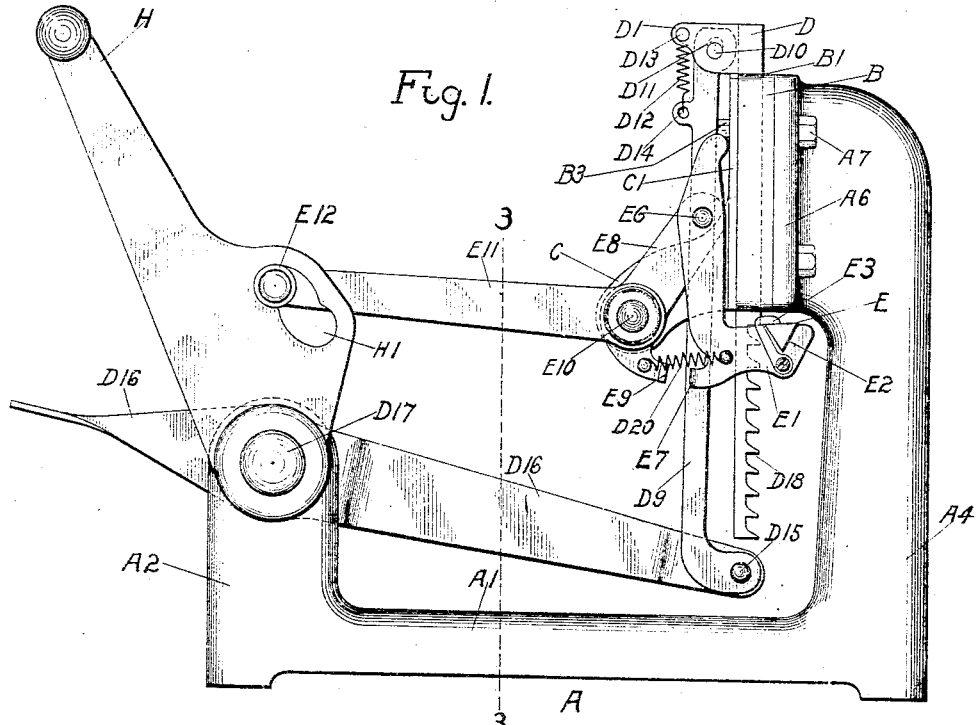

C. WALES.
POSITIONING MECHANISM.
APPLICATION FILED JULY 24, 1911. RENEWED NOV. 11, 1914.

1,122,177.  Patented Dec. 22, 1914.
8 SHEETS—SHEET 1.

WITNESSES
Harry B. Thomson
Edgar M. Camp

INVENTOR
Charles Wales
By Cyrus Kehr
Attorney

C. WALES.
POSITIONING MECHANISM.
APPLICATION FILED JULY 24, 1911. RENEWED NOV. 11, 1914.

1,122,177. Patented Dec. 22, 1914.
8 SHEETS—SHEET 3.

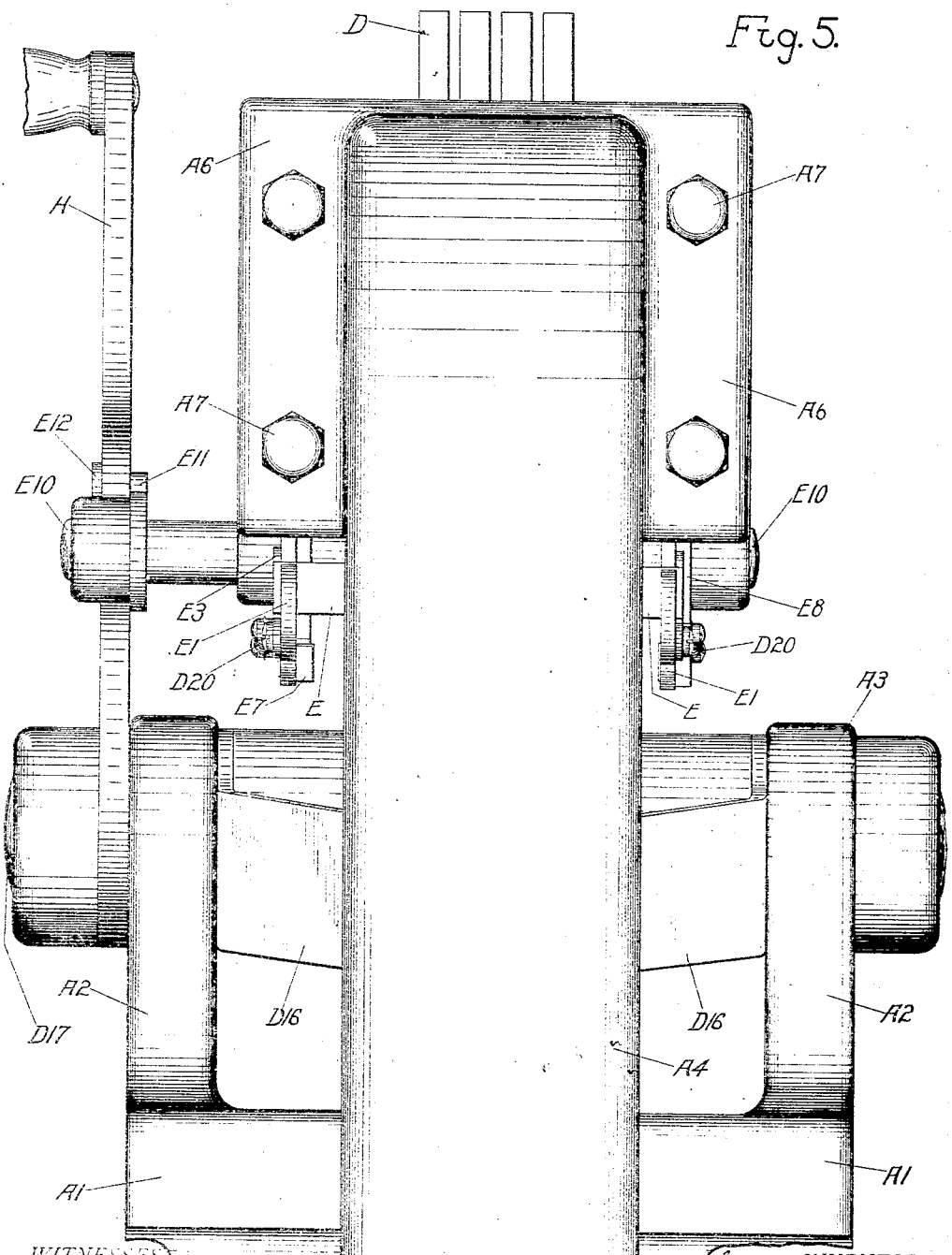

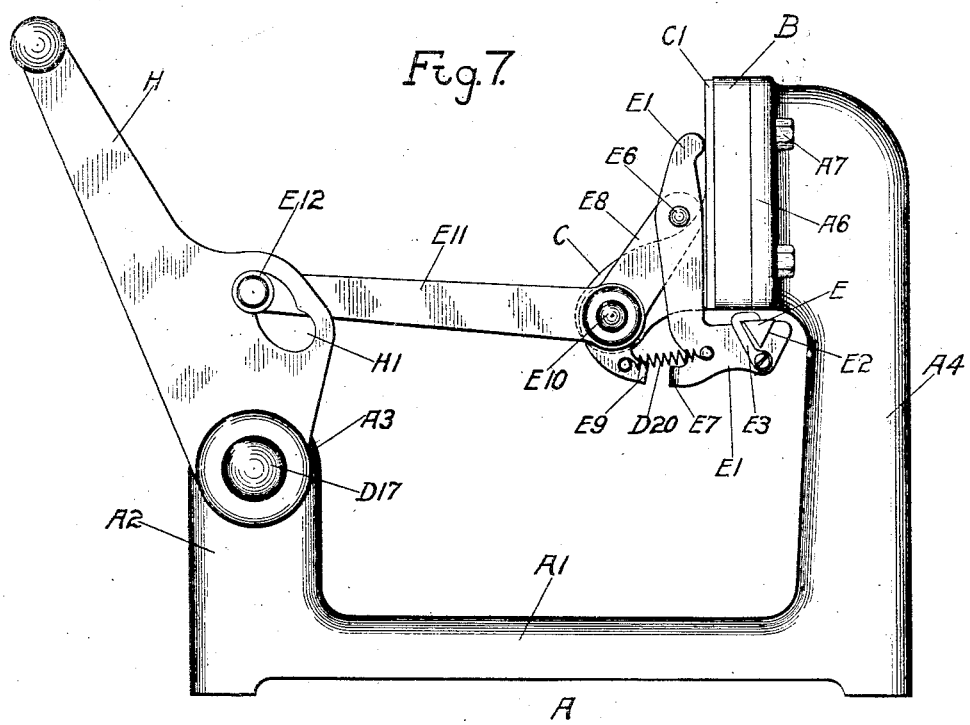

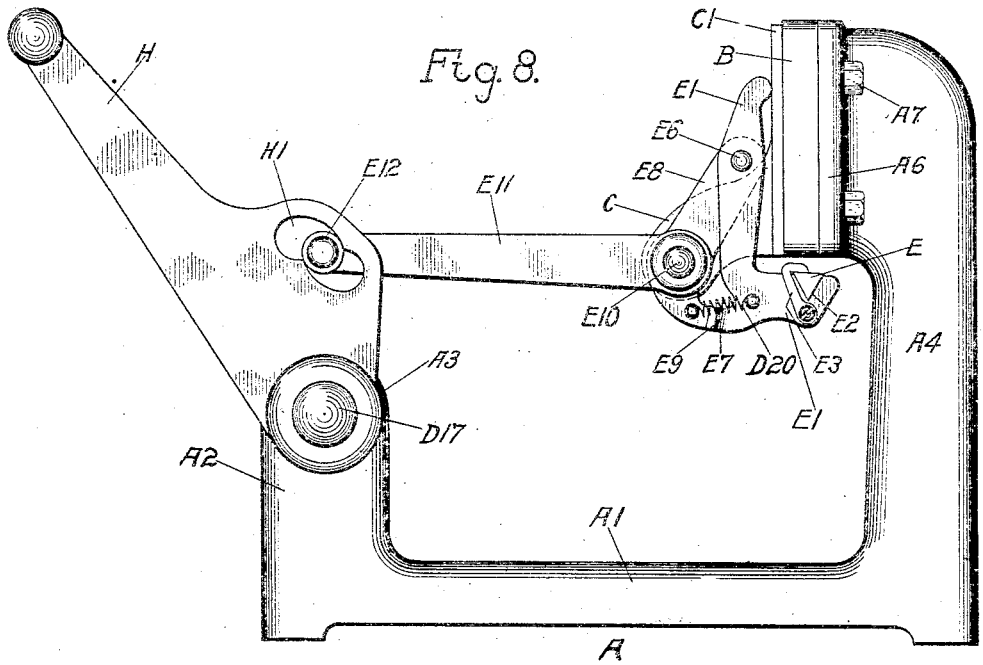
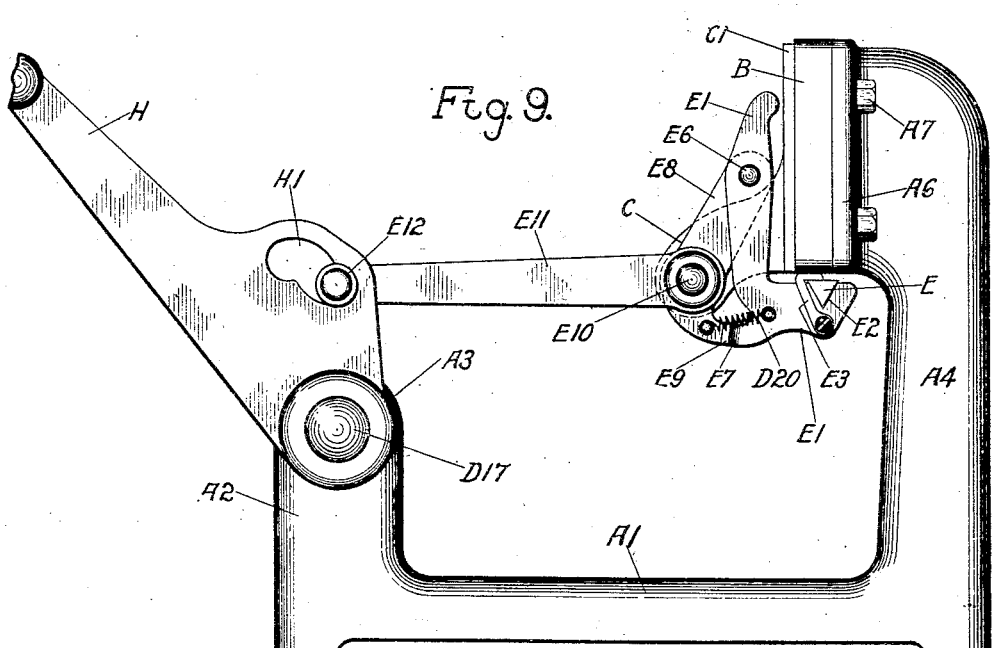

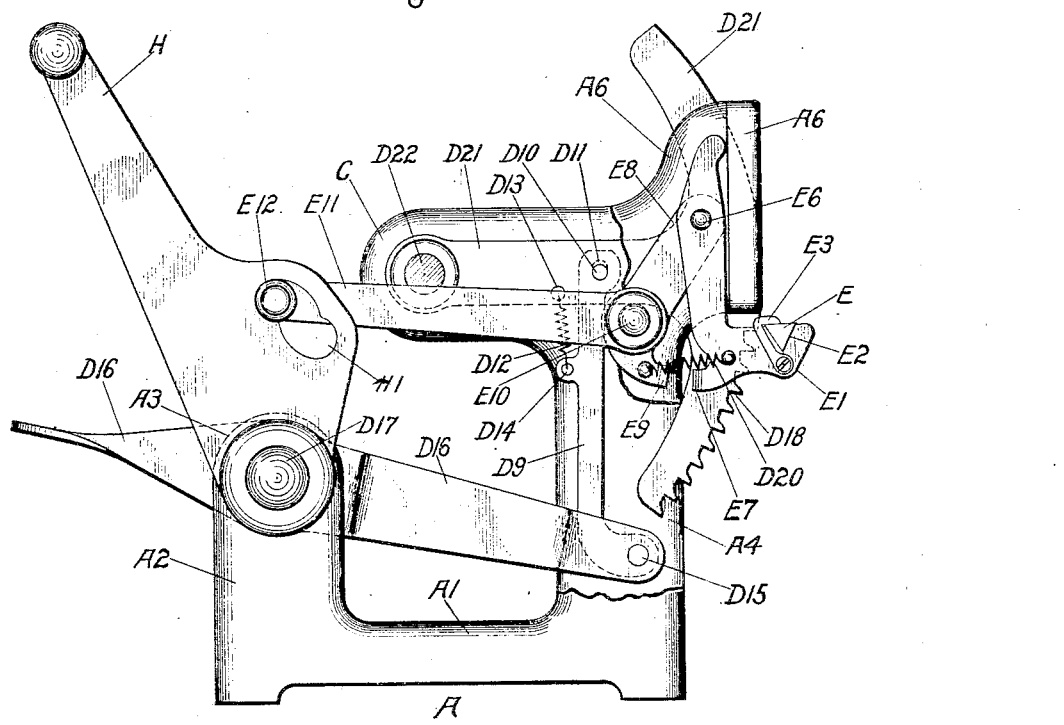

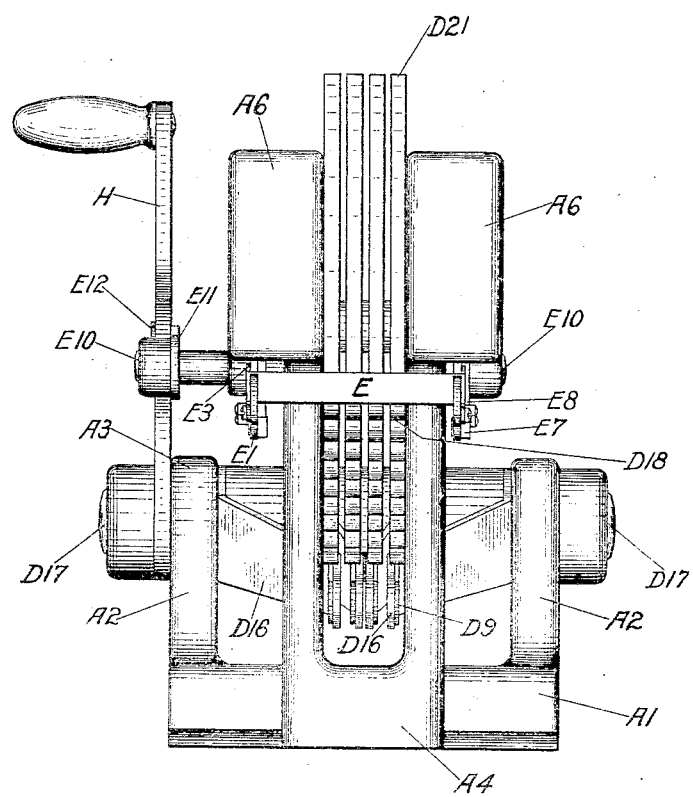

UNITED STATES PATENT OFFICE.

CHARLES WALES, OF NASHVILLE, TENNESSEE, ASSIGNOR TO THE WHITE ADDING MACHINE COMPANY, OF NEW HAVEN, CONNECTICUT, A CORPORATION OF CONNECTICUT.

POSITIONING MECHANISM.

1,122,177.  Specification of Letters Patent.  Patented Dec. 22, 1914.

Application filed July 24, 1911, Serial No. 640,269. Renewed November 11, 1914. Serial No. 871,630.

*To all whom it may concern:*

Be it known that I, CHARLES WALES, a citizen of the United States, residing at Nashville, in the county of Davidson and State of Tennessee, have invented a new and useful Improvement in Positioning Mechanism, of which the following is a specification, reference being had to the accompanying drawing.

My improvement relates particularly to mechanism for positioning a single shiftable mechanical member or a plurality of such members, such member or members being utilized for the performing of any desired useful work, as, for example, a portion of a printing operation in any machine embodying printing mechanism, or a portion of a perforating, punching, or cutting operation. And the member or members to be thus positioned in a path or paths may be confined slidably in a suitable guideway or guideways, or supported by a rigid member or structure turning on an axis, whereby the path is made concentric to such axis.

The object of my invention is to provide for exact positioning by the aid of mechanism having freedom of action and being of such a nature as to require for its operation a minimum of power. For convenience in description the members to be positioned are hereinafter termed the "working" members.

My improved mechanism comprises two independent means or elements acting upon the working member, said elements acting in succession, the first element engaging the working member and moving it a predetermined distance and the second element then engaging said working member and moving it farther to a definite and final predetermined position. The mechanism comprises two actuating levers or handles, one of which transmits motion to said first element and the other of which transmits motion to said second element. The distance through which the working member is moved by said two elements may be varied; but usually the first movement may be relatively long while the second movement is relatively short, the purpose of the first movement being to bring the working member nearly to the desired position, and the purpose of the second movement being to bring such member precisely and finally to the desired position. Such first movement is, for convenience, herein termed the "major movement" while such second movement is termed the "minor movement."

When a plurality of working members are embodied in the same mechanism, a distinct mechanical element may be used for effecting the major movement of each working member, while the minor movement of each member is effected simultaneously by a single mechanical element, herein termed the "minor moving member." This arrangement is useful and desirable when the positions of the several working members are to be varied from time to time, as, for example, when said members consist of upright bars which are to be set to varying positions—each taking first one position and then another.

Figure 2:
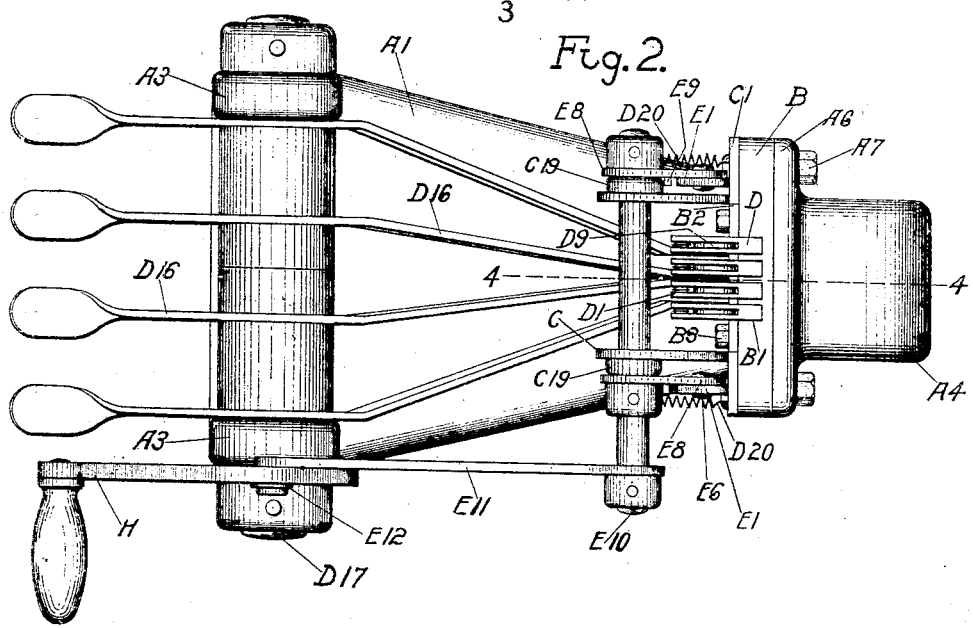
Figure 3:
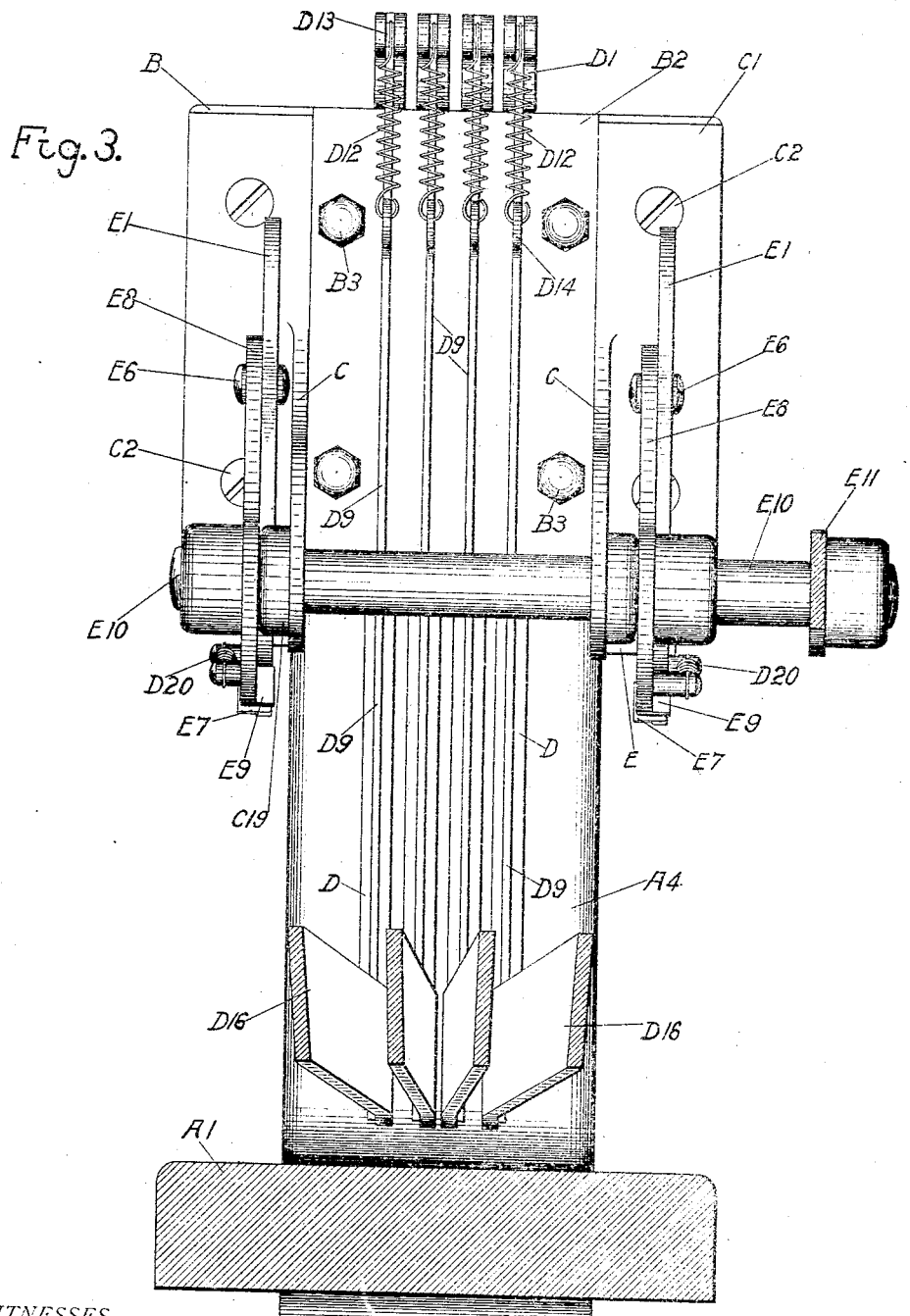
Figure 4:
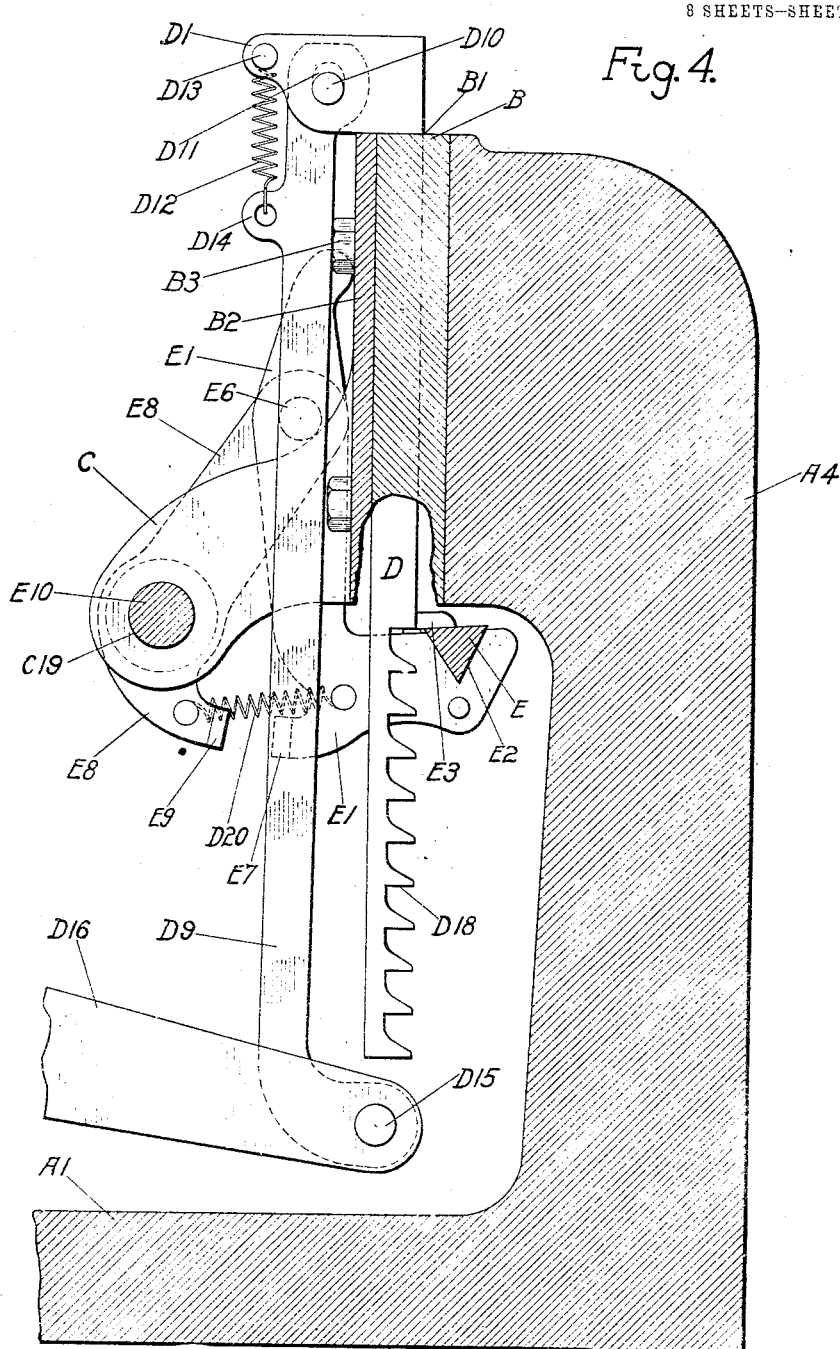

In the accompanying drawings, Figure 1 is a side elevation of a mechanism embodying my improvement, the working members being upright bars confined slidably in upright ways; Fig. 2 is a plan of the structure shown by Fig. 1; Fig. 3 is an enlarged section of the line, 3—3, of Fig. 1, looking toward the right; Fig. 4 is a section of the line, 4—4, of Fig. 2; Fig. 5 is an elevation looking toward the left in Fig. 1; Fig. 6 illustrates diagrammatically the three positions of the minor moving member; Figs. 7, 8 and 9 illustrate in side elevation the minor moving mechanism; Fig. 10 is a side elevation of another form of the mechanism in which the working member is in the form of a sector of a circle having reciprocatory motion on its axis; Fig. 11 is an elevation of the same mechanism looking toward the left.

For convenience in description, the portion of the mechanism at the left, in Fig. 1, is herein termed the front of the mechanism, while the portion at the right is termed the rear of the mechanism. The operative portions of the mechanism are supported by a rigid frame comprising a casting, A, a cross-plate, B, and two side pieces, C. The casting, A, has a horizontal base, $A^1$, tapering from the front to the rear, as viewed in plan. At each forward corner the frame has an upright standard, $A^2$, having a horizontal, transverse bearing, $A^3$. At the rear is a relatively high upright standard, $A^4$, having at its upper end a forward extension, $A^5$, to which is secured a cross-plate, B, by means of bolts, $A^7$. The side pieces, C, are secured to the front of the cross-plate, B, in an upright position, by means of screw bolts, $C^2$, extending through the flanges, $C^1$, of the side pieces, C, into the cross-plate, B. In the front of the cross-plate, B, between the side pieces, C, are four upright channels, $B^1$, and in front of those channels a retaining plate, $B^2$, is secured to the cross-plate, B, by means of screws, $B^3$. Thus, four guideways are formed for as many upright bars; and the four bars are the members to be positioned— the "working members". Each such bar, D, is in operative relation (as hereinafter described) with a key lever to permit the lifting of said bar by the tilting of said key lever upon its fulcrum. And the connections whereby such operative relation is established is preferably such as to leave each bar free for slight upward movement by the action of the minor moving member without disturbing the key lever from the position which it has assumed at the termination of its movement for the lifting of the adjacent bar, D. In the particular form of the mechanism shown by the drawings, this is accomplished by a "slack" link connection between said bar and said key lever, such slack being in this case formed by a slotted, loose, or sliding joint, as will be next described. The body of each such bar is rectangular in cross-section and has at its upper end a horizontal forward extension, $D^1$. To each such bar is applied an approximately upright lifting link, $D^9$, the upper end of such link extending into and being hinged to said forward extension, $D^1$, by a pintle, $D^{10}$, extending immovably through such extension and loosely enough through a bearing, $D^{11}$, in said link, to permit the turning of the latter; but said bearing is elongated in an upright direction, so that said link and the bar may also have a slight up-and-down movement relative to each other. As will appear later on, the object of this elongation is to permit the minor lifting movement of the bar without moving said link. To normally draw said bar down and said link up, a contracting coiled spring, $D^{12}$, has its upper end secured to a pin, $D^{13}$, extending transversely through the forward extension, $D^1$, at the front of said link, while its lower end is secured to an ear, $D^{14}$, formed upon the front of said link.

The lower end of each lifting link, $D^9$, is hinged at $D^{15}$, to a separate, horizontal key lever, $D^{16}$, which is fulcrumed on a horizontal shaft, $D^{17}$, supported by the front standards, $A^2$. By depressing the front or left hand ends of said key levers, the bars, D, may be lifted through various distances. At its rear, each bar, D, has ten horizontal, downward-directed faces, $D^{18}$, spaced from each other evenly upon the same bar and identically upon the four bars. At the rear of the lower portion of said bars is the minor moving member, E. Said member is a bar which is horizontal, and, in the form shown in the drawings, of triangular cross-section. And each end of said bar is supported by a traveler, $E^1$, the latter having a V-shape notch, $E^2$, into which the adjacent end of said bar is laid. Said bar is secured at each end in the adjacent notch, $E^2$, by means of a hook, $E^3$, one end of which is secured to the traveler and the other end of which is extended across the upper face of the bar. By releasing said hooks, the bar may be turned to bring another of its three faces upward. Thus three faces and six edges of said bar may be brought into position in succession to receive wear due to the engagement with the faces, $D^{18}$, of the bars, D. Normally said minor moving member stands rearward out of the path of the bars, D. But when said bar is to operate, the traveler first carries it forward until it stands beneath the adjacent faces, $D^{18}$, on said bars, D, and then upward into engagement with all of said faces which are at the time immediately above said bar, until contact has been made with all of said faces. And this movement continues, all of said bars, D, being carried upward in unison, or as a gang, into their precise and final position. Each traveler, E, extends upward in front of the cross-plate, B, and the adjacent flange, $C^1$, of the adjacent side piece, C; and at $E^6$, at some distance below its upper end said traveler is hinged to the rocking member, $E^8$, which is rigid on the horizontal rock-shaft, $E^{10}$, which rests in bearings, $C^{19}$, in the side pieces, C. Said rock-shaft is turned slightly by the upward and downward movement of the arm, $E^{11}$, which is rigid on said shaft. Such movement is given to said arm by the main handle, H, as will be hereinafter described.

The upper end of the traveler extends far enough rearward to make contact with the front face of the adjacent flange, $C^1$, during the latter portion of the upward movement of the arm, $E^{11}$, and the consequent rearward movement of the upper arm of the rocking member, $E^8$, and the hinge, $E^6$. After such contact has been established, the place of such contact serves as a fulcrum, and the body of the traveler, $E^1$, is driven rearward by the upper arm of the rocking member, $E^8$, such fulcrum being a turning point for such movement of the traveler. There is space enough between the lower portion of the face of the flange, $C^1$, and the adjacent portion of the traveler, to allow said member to move rearward far enough to carry the minor lifting bar rearward out of the path of the working members, and the several parts are so proportioned as to produce a rearward movement of that extent.

Then the working members may move up or down under the control of the link, $D^9$. The lower portion of the traveler, $E^1$, has a forward extension, $E^7$, placed in proper position to abut against the lower end, $E^9$, of the rocking member, $E^8$, when the arm, $E^{11}$, is moved downward so as to carry the rocking member, $E^8$, and the upper portion of the traveler, $E^1$, forward away from the cross-plate, B, and the flange, $C^1$, whereby the extreme upper end of the traveler, $E^1$, is moved out of contact with such flange. While the upper end of the traveler, $E^1$, is thus being freed from the flange, $C^1$, said traveler is made to turn, the lower portion going forward by the action of gravity, the minor moving member and the greater portion of the traveler being rearward of the upright plane of the hinge, $E^6$. The distance between the extension, $E^7$, and the lower end, $E^9$, of the rocking member, $E^8$, when the arm, $E^{11}$, is at its upper limit, is sufficient to allow the lower portion of the traveler, $E^1$, to thus move forward far enough to bring the minor lifting member beneath the faces, $D^{18}$, of the working members which are then immediately above the plane of the upper face of said lifting bar; hence, immediately upon the depression of the arm, $E^{11}$, the minor lifting member moves automatically forward beneath said faces—without being in contact therewith. But said movement is arrested by the abutting of the extension, $E^7$, against the end, $E^9$, of the rocking member. Then the further depression of the arm, $E^{11}$, causes the bodily lifting of the minor moving member, for the traveler must now turn in unison with the rocking member, $E^8$, upon the shaft, $E^{10}$, movement of the traveler, $E^1$, by turning on its hinge, being for the time eliminated, the upper portion of said traveler being held by the hinge, $E^6$, and the lower portion thereof resting by gravity against the extension, $E^9$, of the rocking member.

A contracting coiled spring, $D^{20}$, is secured by one end to the lower portion of the traveler and by its other end to the rocking member to supplement the action of gravity for the movement of the minor moving member leftward. During the upward movement of said minor moving member, all of the working members are lifted by said minor moving member precisely into the chosen position. But it is to be observed that the engagement of the bar constituting the minor moving member with the various working members need not be, and is not expected to be, effected at the same time; for it is to be assumed that the major lifting mechanism, comprising the lifting links, $D^9$, and the lifting levers, $D^{16}$, are inaccurate in the lifting of bars which constitute the working members, so that the faces, $D^{18}$, which are at the time immediately above the minor lifting member are not in true alinement, and therefore are engaged at different times by said minor member during its upward movement. The arm, $E^{11}$, has at its front end a wrist, $E^{12}$, extending into a cam-slot, $H^1$, in the main handle, H, the right hand portion of the cam-slot being nearer the shaft, $D^{17}$, so that the arm, $E^{11}$, will be depressed when the handle, H, is turned toward the left, and raised when said handle is turned toward the right.

In the form shown by Figs. 10 and 11, the key lever, $D^{16}$, the lifting link, $D^9$, and the minor moving member, E, and the actuating parts associated therewith, are the same as in the form already described; but the reciprocatory working member is changed from a straight bar slidable in a straight path, to a working member, $D^{21}$, which is in the form of a sector of a circle turning on a shaft, $D^{22}$, supported in the side pieces, C, which support the rock-shaft, $E^{10}$. The lower portion of the edge of said sector has faces, $D^{18}$, like the faces, $D^{18}$, of the working members, D; and the minor moving member, E, engages said faces just as it does the same faces of the working members, D, of the preceding figures. It is to be noted, that, in the event of the derangement of a key-lever or a lifting link so that the corresponding working member is not brought into proper position to bring a face, $D^{18}$, just above the path of the minor lifting member, no harm will be done when the main handle is shifted for moving the minor lifting bar forward; for then the lifting member will merely bear against the portion of the working member above said face, $D^{18}$, and not move forward through the remainder of its normal path but move upward in contact with the rear face of the working member without exerting damaging strain upon any of the parts of the mechanism, the lifting member being free to thus remain rearward, excepting that the springs, $D^{20}$, (when used) must remain stretched—they having been stretched to put the lifting member rearward of the working members. In the absence of such springs, only gravity must be overcome. Thus it will be seen that the parts of the mechanism are so organized as to give to the lifting member a tendency to move forward automatically when the rocking member, $E^8$, is turned rearward, such tendency being yielding to a resistance which is less than the strength of the parts associated with said lifting member. By thus moving the working member through two ranges of movement, one being relatively long and the other being relatively short, extreme precision may always be attained. For error in the major moving mechanism is eliminated by the movement imparted by the minor moving mechanism, and the second and final range of movement may be made so short that error in the minor moving mechanism will become insignificant. For example, the final range may be one thirty-second of an inch. Then a two per cent. error in the minor moving mechanism will give a distance error of only one sixteen-hundredth of one inch.

I claim as my invention,

1. In a mechanism of the nature described, the combination with a shiftable working member, of major moving means for moving said member through a relatively long range toward a chosen position, and minor moving means movable through a short range for engaging and moving said member precisely into such position.

2. In a mechanism of the nature described, the combination with a reciprocable working member, of major moving means for moving said member through a relatively long range toward a chosen position, and minor moving means for thereafter independently of the major moving means moving through a short range and engaging and moving said member precisely into such chosen position.

3. In a mechanism of the nature described, the combination with a plurality of shiftable working members, of major moving means for moving said members through a relatively long range toward chosen positions, and minor moving means for thereafter independently of the major moving means moving through a relatively short range toward said position and engaging and moving said members precisely into the chosen positions.

4. In a mechanism of the nature described, the combination with a plurality of reciprocable working members, of major moving means moving through relatively long ranges for moving said members into chosen positions, and minor moving means for thereafter independently of the major moving means moving through a relatively short range toward said chosen position and engaging and moving said members precisely into such chosen positions 5. In a mechanism of the nature described, the combination with a plurality of shiftable working members, of separate major moving means for each member for moving it through a relatively long range toward a chosen position, and minor moving means for thereafter independently of the major moving means moving through a relatively short range toward said chosen positions and engaging and moving said members precisely into such chosen positions.

6. In a mechanism of the nature described, the combination with a plurality of reciprocable working members, of separate major moving means for each moving member for moving it through a relatively long range toward a chosen position, and minor moving means for thereafter independently of the major moving means moving through a relatively short range toward said chosen position and engaging and moving said members precisely into such chosen positions.

7. In a mechanism of the nature described, the combination with a plurality of shiftable working members, of separate major moving means for each such member for moving it through a relatively long range toward a chosen position, and a single minor means for thereafter independently of the major means moving through a relatively short range toward said chosen position and engaging and moving said plurality of members as a group or gang precisely into such chosen position.

8. In a mechanism of the nature described, the combination with a shiftable working member, of a lever joined by a slack connection with said working member and adapted for moving said member through a relatively long range toward a chosen position, and means for thereafter independently of the first-mentioned means moving through a relatively short range toward said chosen position and engaging and moving said member precisely into such chosen position.

9. In a mechanism of the nature described, the combination with a reciprocable working member, of a lever joined by a slack connection with said working member and adapted for moving said member through a relatively long range toward a chosen position, and other means for thereafter independently of the first-mentioned means moving through a relatively short range toward said chosen position and engaging and moving said member precisely into such chosen position.

10. In a mechanism of the nature described, the combination with a plurality of shiftable working members, of a lever for each such member, each such lever having a slack connection with its member and being adapted to move said member through a relatively long range toward a chosen position, and other means for thereafter independently of the first-mentioned means moving through a relatively short range toward said chosen position and engaging and moving said members precisely into such chosen positions.

11. In a mechanism of the nature described, the combination with a plurality of reciprocable working members, of a lever for each such member, each lever being joined to its member by a slack connection and adapted to move through a relatively long range for moving its member toward a chosen position, and other means for thereafter independently of the first-mentioned means moving through a relatively short range toward said chosen positions and engaging and moving said members precisely into such chosen positions.

12. In a mechanism of the nature described, the combination with a plurality of shiftable working members, of a lever for each member joined by a slack connection to its member and adapted to move said member through a relatively long range toward a chosen position, and a single other means for thereafter independently of the first-mentioned means moving through a relatively short range toward said chosen positions and engaging and moving said plurality of members as a group or gang precisely into such chosen positions.

13. In a mechanism of the nature described, the combination with a plurality of reciprocable working members, of a lever for each member joined by a slack connection to its member for moving said member through a relatively long range toward a chosen position, and a single other means for thereafter independently of the first-mentioned means moving through a relatively short range toward said chosen positions and engaging and moving said plurality of members as a group or gang precisely into such chosen positions.

14. In a mechanism of the nature described, the combination with a plurality of reciprocable working members, of a lever for each member joined by a slack connection to its member for moving said member through a relatively long range toward a chosen position, and a single other means for thereafter independently of the first-mentioned means moving through a relatively short range toward said chosen positions and engaging and moving said plurality of members as a group or gang precisely into such chosen positions.

15. In a mechanism of the nature described, the combination with a shiftable working member, of a major moving means in operative relation with said working member for moving the latter through a relatively long range toward a chosen position, and a minor moving member arranged for movement into and then along the path of said working member for independently of the major moving means moving the working member through a relatively short range precisely into such chosen position.

16. In a mechanism of the nature described, the combination with a shiftable working member, of a major moving means in operative relation with said working member for moving the latter through a relatively long range toward a chosen position, and a minor moving member arranged for movement transversely to and into the path of the working member and then along said path toward said chosen position for independently of the major moving means moving the working member through a relatively short range precisely into such chosen position.

17. In a mechanism of the nature described, the combination with a reciprocable working member, of a major moving means in operative relation with said working member for moving the latter through a relatively long range toward a chosen position, and a minor moving member arranged for movement into and then along the path of said working member for independently of the major moving means moving the working member through a relatively short range precisely into such chosen position.

18. In a mechanism of the nature described, the combination with a reciprocable working member, of a major moving means in operative relation with said working member for moving the latter through a relatively long range toward a chosen position, and a minor moving member arranged for movement transversely to and into the path of the working member and then along said path toward said chosen position for independently of the major moving means moving the working member through a relatively short range precisely into such chosen position.

19. In a mechanism of the nature described, the combination with a plurality of shiftable working members, of a separate major moving means for each working member in operative relation therewith for moving it through a relatively short range toward a chosen position, and a minor moving member arranged for movement transversely to and into the paths of the working members and then along said paths toward said chosen position for independently of the major moving means moving the working members through a relatively short range precisely into such chosen positions.

20. In a mechanism of the nature described, the combination with a shiftable working member having a series of faces transverse to the path of said member, of means for moving said member through a relatively long range toward a chosen position, and other means for thereafter independently of the first-mentioned means moving toward said chosen position and engaging one of said transverse faces for moving said member through a relatively short range into such chosen position.

21. In a mechanism of the nature described, the combination with a plurality of shiftable working members, each having a series of faces transverse to the path of said member, of means for moving said members through a relatively long range toward chosen positions, and other means for thereafter independently of said first-mentioned means moving toward said chosen position and engaging one of said transverse faces on each of the said moving members for moving said members through a relatively short range into such chosen positions.

22. In a mechanism of the nature described, the combination with a shiftable working member, of means for moving said member through a relatively long range toward a chosen position, a minor moving member, and a traveler supporting said minor member in position for movement toward said chosen position and engagement independently of the first-mentioned moving means with said working member for moving the latter through a relatively short range into such chosen position.

23. In a mechanism of the nature described, the combination with a plurality of shiftable working members, of means for moving said members through a relatively long range toward chosen positions, a minor moving member, a traveler supporting said minor member in position for movement toward said chosen position and engagement independently of the first-mentioned moving means with all of said working members as a group or gang for moving said plurality of members through a relatively short range into such chosen positions.

24. In a mechanism of the nature described, the combination with a shiftable working member, of a key lever, a link joined to said working member and to said lever by joints one of which is a slack joint, said lever and said link being adapted to move said working member through a relatively long range and a minor moving mechanism for moving said working member through a relatively short range precisely into its working position.

25. In a mechanism of the nature described, the combination with a plurality of shiftable working members, of a key lever for each such member, links joined to each of said working members and to each of said key levers by joints, one joint of each such connection being a slack joint, each such lever and its link being adapted to move the corresponding working member through a relatively long range toward a chosen position, and a minor moving mechanism for moving said working members through a relatively short range into such chosen positions.

26. In a mechanism of the nature described, the combination with a shiftable working member, of a key lever, a link joined to said working member and to said lever by joints one of which is a slack joint, each such lever and its link being adapted to move the corresponding working member through a relatively long range toward a chosen position, a spring at such slack joint, and a minor moving mechanism for moving said working members through a relatively short range into such chosen positions.

27. In a mechanism of the nature described, the combination with a plurality of shiftable working members, of a key lever for each such member, links joined to each of said working members and to each of said key levers by joints, one of said joints in each such connection being a slack joint, each such lever and its link being adapted to move the corresponding working member through a relatively long range toward a chosen position, a spring at each such slack joint, and a minor moving mechanism for moving said working members through a relatively short range into such chosen positions.

28. In a mechanism of the nature described, the combination with a plurality of shaftable working members arranged side by side to constitute a group or gang, of means for moving said members toward a chosen position, a minor moving member located adjacent and transversely to said working members, and means located at the opposite sides of said group of working members for supporting said minor moving member and carrying it in a path which is in part transverse and in part parallel to or coincident with the paths or course of such working members.

29. In a mechanism of the nature described, the combination with a shiftable working member, of a major moving means in operative relation with said working member for moving the latter toward a chosen position, and a minor moving member arranged for movement transversely to and into the path of the working member and then in said path in the direction of movement of said member, said minor moving member having a plurality of faces and being adapted to be turned to present any one of said faces for engagement with the working member.

30. In a mechanism of the nature described, the combination with a plurality of shiftable working members, of a separate major moving means for each working member in operative relation therewith for moving it toward a chosen position, and a minor moving member arranged for movement transversely to and into the paths of the working members and then in said paths in the direction of movement of said members, said minor moving member having a plurality of faces and being adapted to be turned to present any one of said faces for engagement with the working members.

31. In a mechanism of the nature described, the combination with a plurality of shiftable working members, of means for moving said members toward but always not quite into a chosen position, a minor moving member having a plurality of faces, a carrier adapted to support said minor member with any one of said faces in position for engagement with all of said working members as a group or gang for moving said plurality of members into such chosen position.

32. In a mechanism of the nature described, the combination with a plurality of shiftable working members arranged side by side to constitute a group or gang, of means for moving said members toward a chosen position, a minor moving member having a plurality of faces and located adjacent and transversely to said working members, and means located at the opposite sides of said group of working members for supporting said minor moving member with any one of its faces directed upward and carrying said member in a path which is in part transverse and in part parallel to and coincident with the paths or course of such working members.

In testimony whereof I have signed my name, in presence of two witnesses, this 19th day of July, in the year one thousand nine hundred and eleven.

CHARLES WALES.

Witnesses:
BRENDA BELL,
JOHN H. DE WITT.